US012692179B2

(12) United States Patent
Ogawa

(10) Patent No.: US 12,692,179 B2
(45) Date of Patent: Jul. 28, 2026

(54) FUNCTIONAL AQUEOUS SOLUTION SUPPLY APPARATUS

(71) Applicant: KURITA WATER INDUSTRIES LTD., Tokyo (JP)

(72) Inventor: Yuuichi Ogawa, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 404 days.

(21) Appl. No.: 18/279,917

(22) PCT Filed: Mar. 9, 2022

(86) PCT No.: PCT/JP2022/010167
§ 371 (c)(1),
(2) Date: Sep. 1, 2023

(87) PCT Pub. No.: WO2022/196470
PCT Pub. Date: Sep. 22, 2022

(65) Prior Publication Data
US 2024/0150206 A1 May 9, 2024

(30) Foreign Application Priority Data
Mar. 15, 2021 (JP) ................................. 2021-041867

(51) Int. Cl.
*C02F 1/68* (2023.01)
*B08B 3/08* (2006.01)
(Continued)

(52) U.S. Cl.
CPC .................. *C02F 1/68* (2013.01); *B08B 3/08* (2013.01); *C02F 1/70* (2013.01); *C02F 1/722* (2013.01); *C02F 1/78* (2013.01); *C02F 2103/02* (2013.01)

(58) Field of Classification Search
CPC ...... C02F 1/66; C02F 1/68; C02F 1/72; C02F 1/78; H01L 21/6704
See application file for complete search history.

(56) References Cited

U.S. PATENT DOCUMENTS

| | | | | |
|---|---|---|---|---|
| 2016/0361693 | A1* | 12/2016 | Hayashi | .............. B01F 35/2132 |
| 2020/0039854 | A1* | 2/2020 | Morita | ...................... C02F 1/66 |
| 2020/0152488 | A1 | 5/2020 | Morita et al. | |

FOREIGN PATENT DOCUMENTS

| | | |
|---|---|---|
| JP | 2018182099 A | 11/2018 |
| JP | 2020188151 A | 11/2020 |

(Continued)

OTHER PUBLICATIONS

International Search Report issued May 31, 2022 in PCT/JP2022/010167 (with English translation), 4 pages.
(Continued)

*Primary Examiner* — Bradley R Spies
(74) *Attorney, Agent, or Firm* — Element IP, PLC

(57) ABSTRACT

Functional aqueous solution supply apparatus (1) has a replenishment water production unit (3) that is supplied with ultrapure water (W) from a pipe conduit (2) and produces functional aqueous solution as washing water (W1), a storage tank (5) that is supplied/replenished with the produced washing water (W1) via a pipe (4), and a circulation pipe conduit (7) that supplies the washing water (W1) from the storage tank (5) to single-wafer type washers (6A, 6B, 6C, and 6D) and returns unused washing water (W1) to the storage tank (5). The circulation pipe conduit (7) is branched into supply pipes (7A, 7B, 7C, and 7D) and is further connected to return pipes (8A, 8B, 8C, and 8D) that communicate into the circulation pipe conduit (7) from the washers (6A, 6B, . . . ), respectively. The operation plan of the washers (6A, 6B, . . . ) is preliminarily transmitted to a control means (9), and this control means (9) can control the
(Continued)

replenishment water production unit (3). Such a functional aqueous solution supply apparatus can supply the functional aqueous solution as the washing water to use points such as washing apparatuses for electronic components/electronic members, etc.

7 Claims, 2 Drawing Sheets

(51) Int. Cl.
  *C02F 1/70*    (2023.01)
  *C02F 1/72*    (2023.01)
  *C02F 1/78*    (2023.01)
  *C02F 103/02*   (2006.01)

(56)       References Cited

FOREIGN PATENT DOCUMENTS

WO  WO-2018190090 A1  10/2018
WO  WO-2020039764 A1  2/2020

OTHER PUBLICATIONS

Office Action issued May 31, 2022 in Japanese Patent Application No. 2021-041867 (with English translation), 9 pages.

* cited by examiner

[FIG. 1]
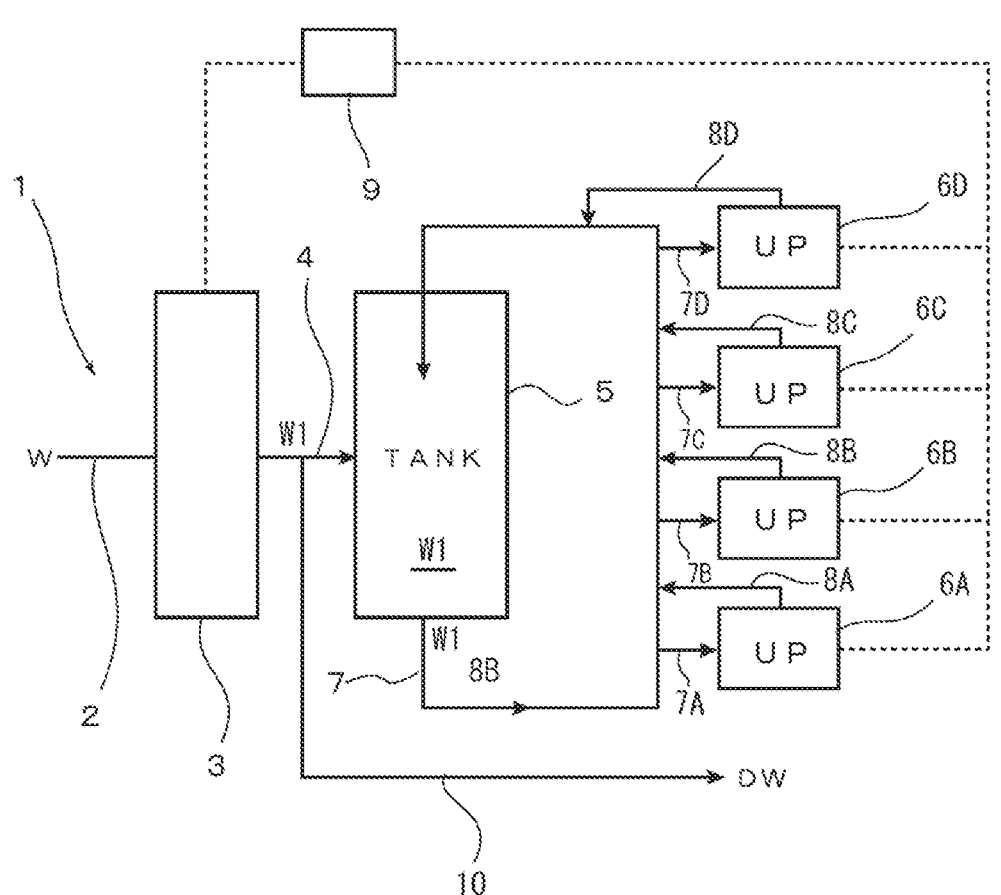

[FIG. 2]
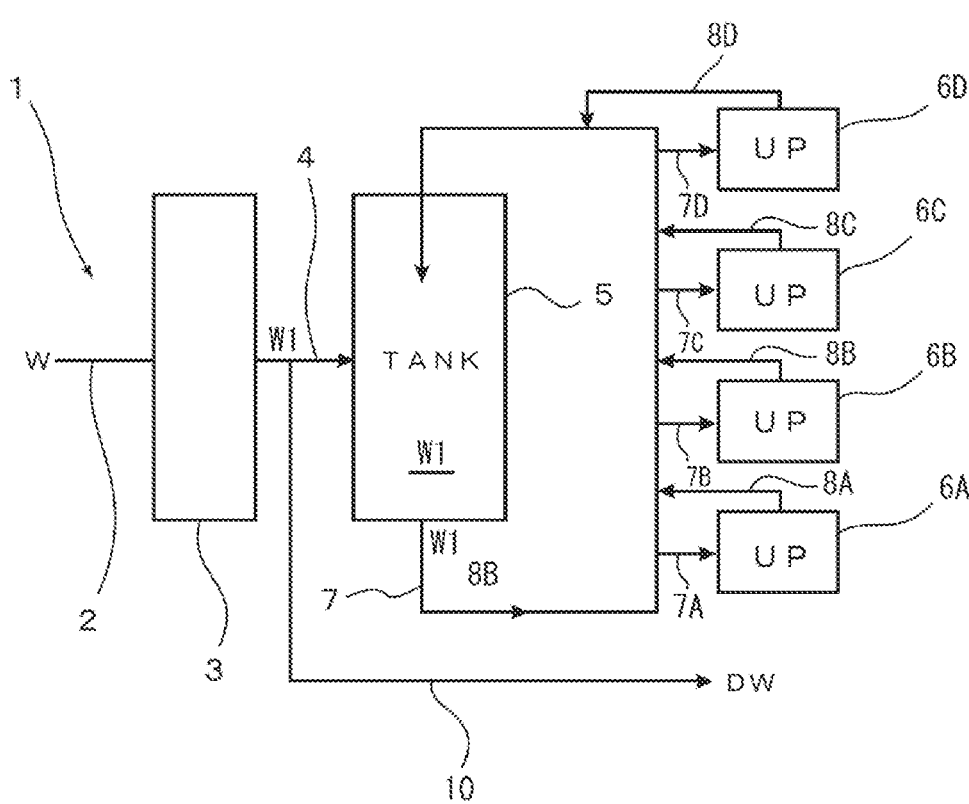

FUNCTIONAL AQUEOUS SOLUTION SUPPLY APPARATUS

TECHNICAL FIELD

The present invention relates to an apparatus that supplies a functional aqueous solution as washing water to a use point such as a washing apparatus for electronic components/ electronic members used in the electronic industry fields and the like and relates particularly to a functional aqueous solution supply apparatus that can efficiently supply the functional aqueous solution as washing water to a use point having a plurality of washers.

BACKGROUND ART

In recent years, functional aqueous solutions imparted with various functions are used as washing solutions for wafer processing in the electronics industry. The functional aqueous solutions may be obtained by adding conductivity-imparting substances, redox potential-adjusting substances, gases, etc. to ultrapure. For a method of supplying the functional aqueous solution, Patent Document 1 proposes a scheme in which a storage tank is provided for the purpose of saving water, and the functional aqueous solution not used in a washer is returned to the storage tank and circulated.

PRIOR ART DOCUMENTS

Patent Documents

[Patent Document 1] JP2018-182099A

SUMMARY OF THE INVENTION

Problems to be Solved by the Invention

In the scheme described in Patent Document 1, however, the storage tank is replenished with an adjusted functional aqueous solution, and in this operation the flow rate of the replenishment water is kept constant in order to stabilize the concentration of the functional aqueous solution to be replenished, thus leading to a problem in that even when the storage tank is not replenished with the functional aqueous solution, it is necessary to continue producing the functional aqueous solution as the replenishment water and discharge the surplus as drain water, and the effect of saving water is small. In particular, when the use point has a plurality of single-wafer type wafer washers, the amount of washing water to be used varies greatly, resulting in a large amount of drain water to be discharged.

The present invention has been made in view of the above problems, and an object of the present invention is to provide a functional aqueous solution supply apparatus that can supply the functional aqueous solution as washing water to a use point such as a washing apparatus for electronic components/electronic members.

Means for Solving the Problems

In view of the above object, the present invention provides a functional aqueous solution supply apparatus that supplies a use point with washing water obtained by adding one or more functional components selected from a conductivity-imparting substance, a redox potential-adjusting substance, and a pH-adjusting substance to raw water, the functional aqueous solution supply apparatus comprising: a replenishment water production unit that produces the washing water; a storage tank that is supplied/replenished with the washing water produced in the replenishment water production unit and stores the washing water; a circulation-type washing water supply pipe that supplies the washing water from the storage tank to the use point; a return pipe that returns unused washing water at the use point to the circulation-type washing water supply pipe; and a control means that controls, based on usage plan information of the washing liquid at the use point, a replenishment amount of the washing water supplied from the replenishment water production unit to the storage tank (Invention 1).

According to the invention (Invention 1), the replenishment amount of the functional aqueous solution as washing water to the storage tank is controlled based on the usage plan information of the washing liquid at the use point, and the discharge amount of the functional aqueous solution can thereby be significantly reduced. Moreover, the production amount of the functional aqueous solution can also be reduced. Furthermore, the production amount of the functional aqueous solution can be preliminarily set in accordance with the required amount based on the replenishment amount of the washing water which is supplied from the replenishment water production unit to the storage tank based on the usage plan information of the washing liquid, and the concentration of the functional aqueous solution can therefore be controlled with high accuracy.

In the above invention (Invention 1), the use point may preferably have a plurality of washers (Invention 2).

The amount of washing liquid used at the use point varies greatly depending on the operating status of the plurality of washers, but according to the invention (Invention 2), it is possible to significantly reduce the discharge amount of the functional aqueous solution and also reduce the production amount of the functional aqueous solution through preliminarily acquiring the operating information of the washers, preliminarily estimating the amount of the washing liquid used at the use point, and controlling its production/replenishment amount.

In the above invention (Invention 1, 2), the conductivity-imparting substance may be preferably ammonia or carbonic acid (Invention 3).

According to the invention (Invention 3), it can be particularly suitably applied when a very small amount of ammonia or carbonic acid is to be dissolved.

Furthermore, in the above invention (Invention 1, 2), the redox potential-adjusting substance may be preferably hydrogen peroxide, $O_3$, or $H_2$ (Invention 4).

According to the invention (Invention 4), it can be particularly suitably applied when a very small amount of hydrogen peroxide or $O_3$ is to be dissolved.

Advantageous Effect of the Invention

According to the functional aqueous solution supply apparatus of the present invention, the replenishment amount of the washing water supplied from the replenishment water production unit to the storage tank can be controlled based on the usage plan information of the washing liquid at the use point; therefore, the discharge amount of the functional aqueous solution can be significantly reduced, and the production amount of the functional aqueous solution can also be reduced. Furthermore, the concentration of the functional aqueous solution can be controlled with high accuracy by preliminarily setting, based on the usage plan information of the washing liquid, the replenishment amount of the washing water which is supplied from the replenishment water production unit to the storage tank. In particular, the amount of washing liquid used at the use point varies greatly depending on the operating status of the plurality of washers, but in such a case the present invention can be suitably applied.

BRIEF DESCRIPTION OF DRAWINGS

FIG. 1 is a schematic diagram illustrating the functional aqueous solution supply apparatus according to an embodiment of the present invention.

FIG. 2 is a schematic diagram illustrating a conventional functional aqueous solution supply apparatus.

EMBODIMENTS FOR CARRYING OUT THE INVENTION

Hereinafter, an embodiment of the functional aqueous solution supply apparatus of the present invention will be described in detail with reference to the accompanying drawings.

«Functional Aqueous Solution Supply Apparatus»

FIG. 1 illustrates the functional aqueous solution supply apparatus according to an embodiment of the present invention. Specifically, FIG. 1 illustrates a functional aqueous solution supply apparatus 1 for adding a pH-adjusting substance, a redox potential-adjusting substance, etc. to ultrapure water W as the raw material water to produce washing water W1 and supplying the washing water W1 to a washer for semiconductor wafers as a use point. The functional aqueous solution supply apparatus 1 has a replenishment water production unit 3 that is supplied with the ultrapure water W from a pipe conduit 2 and produces functional aqueous solution as the washing water W1, a storage tank 5 that is supplied/replenished with the produced washing water W1 via a pipe 4, and a circulation pipe conduit 7 that supplies the washing water W1 from the storage tank 5 to a plurality of single-wafer type washers 6A, 6B, 6C, and 6D (four washers in the present embodiment) as use points and returns unused washing water W1 to the storage tank 5. The circulation pipe conduit 7 is branched into supply pipes 7A, 7B, 7C, and 7D that supply the washing water W1 to respective washers 6A, 6B, . . . and is further connected to return pipes 8A, 8B, 8C, and 8D that communicate into the circulation pipe conduit 7 from the washers 6A, 6B, . . . , respectively. The operation plan of the washers 6A, 6B, . . . as the use points is preliminarily transmitted to a control means 9 such as a personal computer, and this control means 9 can control the replenishment water production unit 3. Reference numeral 10 represents a drain pipe that discharges drain water DW.

<Ultrapure Water>

In the present embodiment, preferred properties of the ultrapure water W as the raw water may be, for example, resistivity: 18.1 MΩ·cm or more, fine particles: 1000 particles/L or less with a particle diameter of 50 nm or more, viable bacteria: 1 bacterium/L or less, TOC (Total Organic Carbon): 1 µg/L or less, total silicon: 0.1 µg/L or less, metals: 1 ng/L or less, ions: 10 ng/L or less, hydrogen peroxide; 30 µg/L or less, and water temperature: $25\pm2°$ C.

<pH-Adjusting Substance>

In the present embodiment, the pH-adjusting substance is not particularly limited, and when adjusting the pH to lower than 7, a liquid such as citric acid, formic acid, or hydrochloric acid or a gas such as $CO_2$ can be used. When adjusting the pH to 7 or higher, ammonia, sodium hydroxide, potassium hydroxide, or the like can be used. These pH-adjusting substances may also serve as conductivity-imparting substances even when added in very small amounts.

<Redox Potential-Adjusting Substance>

In the present embodiment, the redox potential-adjusting substance is not particularly limited, but in order to adjust the redox potential to the positive side, a liquid such as hydrogen peroxide water or a gas such as ozone gas ($O_3$) or oxygen gas ($O_2$) can be used. On the other hand, in order to adjust the redox potential to the negative side, a liquid such as oxalic acid or a gas such as hydrogen ($H_2$) can be used.

«Method of Supplying Functional Water»

The description will now be made below for a method of supplying the functional aqueous solution W1 using the functional aqueous solution supply apparatus 1 of the present embodiment having the configuration as described previously.

First, the washing water (functional aqueous solution) W1 is produced in the replenishment water production unit 3 through supplying the ultrapure water W to the replenishment water production unit 3 and adding one or more selected from a conductivity-imparting substance, a redox potential-adjusting substance, and a pH-adjusting substance. This functional aqueous solution W1 is once stored in the storage tank 5 from the pipe 4. Once a predetermined amount of the washing water W1 is stored, a liquid feed pump (not illustrated) is driven to supply the washing water W1 to the washers 6A, 6B, . . . from the circulation pipe conduit 7 through the supply pipes 7A, 7B, 7C, and 7D. In this operation, the washing water W1 not used in the single-wafer type washers 6A, 6B, 6C, and 6D is returned from the return pipes 8A, 8B, 8C, and 8D to the circulation pipe conduit 7 to flow back into the storage tank 5. The washing water W1 returned at this time is in a state in which the dissolved oxygen is increased due to contact with the air, such as in the single-wafer type washers 6A, 6B, 6C, 6D, etc., so the washing water W1 may be returned after removing the dissolved oxygen as necessary.

As the washing water W1 is supplied to such single-wafer type washers 6A, 6B, . . . , the washing water W1 in the storage tank 5 decreases. Accordingly, the washing water W1 produced in the replenishment water production unit 3 is replenished to the storage tank 5 through the pipe 4. In the present embodiment, the operating information of the washers 6A, 6B, . . . is preliminarily obtained, and the amount of washing water W1 used is predicted by the control means 9 based on the operating information. Then, the amount of washing water W1 to be produced in the replenishment water production unit 3 is set in accordance with the predicted amount used, and the storage tank 5 is thereby replenished with the washing water W1 in response to the variation in the amount used. This can reduce the production amount of the washing water W1 and also significantly reduce the discharge amount of the washing water W1. Moreover, an additional effect can be obtained that the chemical concentration of the washing water W1 can be controlled with high accuracy.

The present invention has been described above based on the aforementioned embodiment with reference to the accompanying drawings, but the present invention is not limited to the above embodiment, and various modifications are possible. For example, in the replenishment water production unit 3, pluralities of pH-adjusting substances, redox potential-adjusting substances, etc. can be combined and dissolved to form the functional aqueous solution (washing water) W1.

EXAMPLES

The present invention will be described in more detail with the following specific examples.

Comparative Example 1

A simplified version of the functional aqueous solution supply apparatus 1 illustrated in FIG. 1 was prepared as illustrated in FIG. 2. The functional aqueous solution supply apparatus 1 illustrated in FIG. 2 does not have the control means 9 for controlling the replenishment water production unit 3 and is configured to discharge the surplus washing water W1 from the drain pipe 10. Using this functional aqueous solution supply apparatus 1, the ultrapure water W was supplied to the replenishment water production unit 3 at 150 L/min, ammonia (conductivity-imparting substance) was added to the ultrapure water W so that the conductivity would be 1 μS/cm, hydrogen peroxide (redox potential-adjusting substance) was further added to 100 ppm to produce the washing water (functional aqueous solution) W1, and the produced washing water W1 was sent to the storage tank 5. The washing water W1 was sent from the storage tank 5 to the four washers 6A, 6B, 6C, and 6D, and the unused washing water W1 was returned to the storage tank 5. When the level of the storage tank 5 was low, it was replenished with the washing water W1 from the replenishment water production unit 3, while when the level was high, the washing water W1 produced in the replenishment water production unit 3 was not fed into the storage tank 5 and was discharged from the drain pipe 10 as the drain water DW.

As a result, the average flow rate of drain water was 110 mL/min. The variation in the ammonia concentration of the washing water W1 sent from the storage tank 5 to the washers 6A, 6B, . . . was <±10%, while the variation in the hydrogen peroxide concentration was also <±10%.

Table 1 lists the presence or absence of control of the replenishment water production unit, the conductivity-imparting substance and its set value, and the redox potential-adjusting substance and its set concentration in Comparative Example 1. Table 2 lists the variation rate of the conductivity, the variation rate of the concentration of the redox potential-adjusting substance, and the average drain water flow rate.

Comparative Example 2

Using the functional aqueous solution supply apparatus 1 illustrated in FIG. 2, the ultrapure water W was supplied to the replenishment water production unit 3 at 150 L/min, ammonia was added to the ultrapure water W so that the conductivity would be 100 μS/cm, hydrogen peroxide was further added to 100 ppm to produce the washing water W1, and the produced washing water W1 was sent to the storage tank 5. The washing water W1 was sent from the storage tank 5 to the four washers 6A, 6B, 6C, and 6D, and the unused washing water W1 was returned to the storage tank 5. When the level of the storage tank 5 was low, it was replenished with the washing water W1 from the replenishment water production unit 3, while when the level was high, the washing water W1 produced in the replenishment water production unit 3 was not fed into the storage tank 5 and was discharged from the drain pipe 10 as the drain water DW.

As a result, the average flow rate of drain water was 110 L/min. The variation in the ammonia concentration of the washing water W1 sent from the storage tank 5 to the washers 6A, 6B, . . . was <±10%, while the variation in the hydrogen peroxide concentration was also <±10%.

Table 1 also lists the presence or absence of control of the replenishment water production unit, the conductivity-imparting substance and its set value, and the redox potential-adjusting substance and its set concentration in Comparative Example 2. Table 2 also lists the variation rate of the conductivity, the variation rate of the concentration of the redox potential-adjusting substance, and the average drain water flow rate.

Comparative Example 3

Using the functional aqueous solution supply apparatus 1 illustrated in FIG. 2, the ultrapure water W was supplied to the replenishment water production unit 3 at 150 L/min, ammonia was added to the ultrapure water W so that the conductivity would be 100 μS/cm, ozone ($O_3$) (redox potential-adjusting substance) was further added to 30 ppm to produce the washing water W1, and the produced washing water W1 was sent to the storage tank 5. The washing water W1 was sent from the storage tank 5 to the four washers 6A, 6B, 6C, and 6D, and the unused washing water W1 was returned to the storage tank 5. When the level of the storage tank 5 was low, it was replenished with the washing water W1 from the replenishment water production unit 3, while when the level was high, the washing water W1 produced in the replenishment water production unit 3 was not fed into the storage tank 5 and was discharged from the drain pipe 10 as the drain water DW.

As a result, the average flow rate of drain water was 110 L/min. The variation in the ammonia concentration of the washing water W1 sent from the storage tank 5 to the washers 6A, 6B, . . . was <±10%, while the variation in the ozone concentration was also <±10%.

Table 1 also lists the presence or absence of control of the replenishment water production unit, the conductivity-imparting substance and its set value, and the redox potential-adjusting substance and its set concentration in Comparative Example 3. Table 2 also lists the variation rate of the conductivity, the variation rate of the concentration of the redox potential-adjusting substance, and the average drain water flow rate.

Comparative Example 4

Using the functional aqueous solution supply apparatus 1 illustrated in FIG. 2, the ultrapure water W was supplied to the replenishment water production unit 3 at 150 L/min, ammonia was added to the ultrapure water W so that the conductivity would be 100 μS/cm, hydrogen gas ($H_2$) (redox potential-adjusting substance) was further added to 1.2 ppm to produce the washing water W1, and the produced washing water W1 was sent to the storage tank 5. The washing water W1 was sent from the storage tank 5 to the four washers 6A, 6B, 6C, and 6D, and the unused washing water W1 was returned to the storage tank 5. When the level of the storage tank was low, it was replenished with the washing water W1 from the replenishment water production unit 3, while when the level was high, the washing water W1 produced in the replenishment water production unit 3 was not fed into the storage tank 5 and was discharged from the drain pipe 10 as the drain water DW.

As a result, the average flow rate of drain water was 110 L/min. The variation in the ammonia concentration of the washing water W1 sent from the storage tank 5 to the washers 6A, 6B, . . . was <±10%, while the variation in the hydrogen concentration was also <±10%.

Table 1 also lists the presence or absence of control of the replenishment water production unit, the conductivity-imparting substance and its set value, and the redox potential-adjusting substance and its set concentration in Comparative Example 4. Table 2 also lists the variation rate of the conductivity, the variation rate of the concentration of the redox potential-adjusting substance, and the average drain water flow rate.

Comparative Example 5

Using the functional aqueous solution supply apparatus 1 illustrated in FIG. 2, the ultrapure water W was supplied to the replenishment water production unit 3 at 150 L/min, carbon dioxide ($CO_2$) (conductivity-imparting substance) was added to the ultrapure water W so that the conductivity would be 10 μS/cm, hydrogen peroxide was further added to 100 ppm to produce the washing water W1, and the produced washing water W1 was sent to the storage tank 5. The washing water W1 was sent from the storage tank 5 to the four washers 6A, 6B, 6C, and 6D, and the unused washing water W1 was returned to the storage tank 5. When the level of the storage tank 5 was low, it was replenished with the washing water W1 from the replenishment water production unit 3, while when the level was high, the washing water W1 produced in the replenishment water production unit 3 was not fed into the storage tank 5 and was discharged from the drain pipe 10 as the drain water DW.

As a result, the average flow rate of drain water was 110 L/min. The variation in the carbonic acid concentration of the washing water W1 sent from the storage tank 5 to the washers 6A, 6B, . . . was <±10%, while the variation in the hydrogen peroxide concentration was also <±10%.

Table 1 also lists the presence or absence of control of the replenishment water production unit, the conductivity-imparting substance and its set value, and the redox potential-adjusting substance and its set concentration in Comparative Example 5. Table 2 also lists the variation rate of the conductivity, the variation rate of the concentration of the redox potential-adjusting substance, and the average drain water flow rate.

Comparative Example 6

Using the functional aqueous solution supply apparatus 1 illustrated in FIG. 2, the ultrapure water W was supplied to the replenishment water production unit 3 at 150 L/min, carbon dioxide ($CO_2$) was added to the ultrapure water W so that the conductivity would be 10 μS/cm, ozone ($O_3$) was further added to 30 ppm to produce the washing water W1, and the produced washing water W1 was sent to the storage tank 5. The washing water W1 was sent from the storage tank 5 to the four washers 6A, 6B, 6C, and 6D, and the unused washing water W1 was returned to the storage tank 5. When the level of the storage tank 5 was low, it was replenished with the washing water W1 from the replenishment water production unit 3, while when the level was high, the washing water W1 produced in the replenishment water production unit 3 was not fed into the storage tank 5 and was discharged from the drain pipe 10 as the drain water DW.

As a result, the average flow rate of drain water was 110 L/min. The variation in the carbonic acid concentration of the washing water W1 sent from the storage tank 5 to the washers 6A, 6B, . . . was <±10%, while the variation in the ozone concentration was also <±10%.

Table 1 also lists the presence or absence of control of the replenishment water production unit, the conductivity-imparting substance and its set value, and the redox potential-adjusting substance and its set concentration in Comparative Example 6. Table 2 also lists the variation rate of the conductivity, the variation rate of the concentration of the redox potential-adjusting substance, and the average drain water flow rate.

Comparative Example 7

Using the functional aqueous solution supply apparatus 1 illustrated in FIG. 2, the ultrapure water W was supplied to the replenishment water production unit 3 at 150 L/min, carbon dioxide ($CO_2$) was added to the ultrapure water W so that the conductivity would be 10 μS/cm, hydrogen gas ($H_2$) was further added to 1.2 ppm to produce the washing water W1, and the produced washing water W1 was sent to the storage tank 5. The washing water W1 was sent from the storage tank 5 to the four washers 6A, 6B, 6C, and 6D, and the unused washing water W1 was returned to the storage tank 5. When the level of the storage tank 5 was low, it was replenished with the washing water W1 from the replenishment water production unit 3, while when the level was high, the washing water W1 produced in the replenishment water production unit 3 was not fed into the storage tank 5 and was discharged from the drain pipe 10 as the drain water DW.

As a result, the average flow rate of drain water was 110 L/min. The variation in the carbonic acid concentration of the washing water W1 sent from the storage tank 5 to the washers 6A, 6B, . . . was <±10%, while the variation in the hydrogen concentration was also <±10%.

Table 1 also lists the presence or absence of control of the replenishment water production unit, the conductivity-imparting substance and its set value, and the redox potential-adjusting substance and its set concentration in Comparative Example 6. Table 2 also lists the variation rate of the conductivity, the variation rate of the concentration of the redox potential-adjusting substance, and the average drain water flow rate.

Comparative Example 8

Using the functional aqueous solution supply apparatus 1 illustrated in FIG. 2, the ultrapure water W was supplied to the replenishment water production unit 3 at 150 L/min, ammonia was added to the ultrapure water W so that the conductivity would be 1 μS/cm, hydrogen peroxide was further added to 100 ppm to produce the washing water W1, and the produced washing water W1 was sent to the storage tank 5. The washing water W1 was sent from the storage tank 5 to the four washers 6A, 6B, 6C, and 6D, and the unused washing water W1 was returned to the storage tank 5. When the level of the storage tank 5 was low, it was replenished with the washing water W1 from the replenishment water production unit 3, while when the level was high, the production of the washing water W1 in the replenishment water production unit 3 was stopped.

As a result, the average flow rate of drain water was 0 L/min. The variation in the ammonia concentration of the washing water W1 sent from the storage tank 5 to the washers 6A, 6B, . . . was <±200%, while the variation in the hydrogen peroxide concentration was <±100%. From these facts, it has been found that the amount of drain water is small, but the variations in the concentrations are large and not practical.

Table 1 also lists the presence or absence of control of the replenishment water production unit, the conductivity-imparting substance and its set value, and the redox potential-adjusting substance and its set concentration in Comparative Example 8. Table 2 also lists the variation rate of the conductivity, the variation rate of the concentration of the redox potential-adjusting substance, and the average drain water flow rate.

Comparative Example 9

Using the functional aqueous solution supply apparatus 1 illustrated in FIG. 2, the ultrapure water W was supplied to the replenishment water production unit 3 at 150 L/min, ammonia was added to the ultrapure water W so that the conductivity would be 100 μS/cm, hydrogen peroxide was further added to 100 ppm to produce the washing water (functional aqueous solution) W1, and the produced washing water W1 was sent to the storage tank 5. The washing water W1 was sent from the storage tank 5 to the four washers 6A, 6B, 6C, and 6D, and the unused washing water W1 was returned to the storage tank 5. When the level of the storage tank was low, it was replenished with the washing water W1 from the replenishment water production unit 3, while when the level was high, the production of the washing water W1 in the replenishment water production unit 3 was stopped.

As a result, the average flow rate of drain water was 0 L/min. The variation in the ammonia concentration of the washing water W1 sent from the storage tank 5 to the washers 6A, 6B, . . . was <±80%, while the variation in the hydrogen peroxide concentration was <±100%. From these facts, it has been found that the amount of drain water is small, but the variations in the concentrations are large and not practical.

Table 1 also lists the presence or absence of control of the replenishment water production unit, the conductivity-imparting substance and its set value, and the redox potential-adjusting substance and its set concentration in Comparative Example 9. Table 2 also lists the variation rate of the conductivity, the variation rate of the concentration of the redox potential-adjusting substance, and the average drain water flow rate.

Example 1

Using the functional aqueous solution supply apparatus 1 illustrated in FIG. 1, the ultrapure water W was supplied to the replenishment water production unit 3, ammonia (conductivity-imparting substance) was added to the ultrapure water W so that the conductivity would be 1 μS/cm, hydrogen peroxide (redox potential-adjusting substance) was further added to 100 ppm to produce the washing water (functional aqueous solution) W1, and the produced washing water W1 was sent to the storage tank 5. The washing water W1 was sent from the storage tank 5 to the four washers 6A, 6B, 6C, and 6D, and the unused washing water W1 was returned to the storage tank 5. Then, data on the amount of washing water W1 used was preliminarily calculated by the control means 9 from the operating information of the washers 6A, 6B, 6C, and 6D, the replenishment water production unit 3 was controlled based on the data on the amount of washing water W1 used, and the production amount of the washing water W1 in the replenishment water production unit 3 was adjusted in accordance with that amount used. In this operation, surplus washing water W1 was discharged as drain water.

As a result, the average flow rate of drain water was 30 mL/min. The variation in the ammonia concentration of the washing water W1 sent from the storage tank 5 to the washers 6A, 6B, . . . was <±10%, while the variation in the hydrogen peroxide concentration was also <±10%.

Table 1 also lists the presence or absence of control of the replenishment water production unit, the conductivity-imparting substance and its set value, and the redox potential-adjusting substance and its set concentration in Example 1. Table 2 also lists the variation rate of the conductivity, the variation rate of the concentration of the redox potential-adjusting substance, and the average drain water flow rate.

Example 2

Using the functional aqueous solution supply apparatus 1 illustrated in FIG. 1, the ultrapure water W was supplied to the replenishment water production unit 3, ammonia was added to the ultrapure water W so that the conductivity would be 100 μS/cm, hydrogen peroxide was further added to 100 ppm to produce the washing water W1, and the produced washing water W1 was sent to the storage tank 5. The washing water W1 was sent from the storage tank 5 to the four washers 6A, 6B, 6C, and 6D, and the unused washing water W1 was returned to the storage tank 5. Then, data on the amount of washing water W1 used was preliminarily calculated by the control means 9 from the operating information of the washers 6A, 6B, 6C, and 6D, the replenishment water production unit 3 was controlled based on the data on the amount of washing water W1 used, and the production amount of the washing water W1 in the replenishment water production unit 3 was adjusted in accordance with that amount used. In this operation, surplus washing water W1 was discharged as drain water.

As a result, the average flow rate of drain water was 30 mL/min. The variation in the ammonia concentration of the washing water W1 sent from the storage tank 5 to the washers 6A, 6B, . . . was <±10%, while the variation in the hydrogen peroxide concentration was also <±10%.

Table 1 also lists the presence or absence of control of the replenishment water production unit, the conductivity-imparting substance and its set value, and the redox potential-adjusting substance and its set concentration in Example 2. Table 2 also lists the variation rate of the conductivity, the variation rate of the concentration of the redox potential-adjusting substance, and the average drain water flow rate.

Example 3

Using the functional aqueous solution supply apparatus 1 illustrated in FIG. 1, the ultrapure water W was supplied to the replenishment water production unit 3, ammonia was added to the ultrapure water W so that the conductivity would be 100 μS/cm, ozone ($O_3$) (redox potential-adjusting substance) was further added to 30 ppm to produce the washing water W1, and the produced washing water W1 was sent to the storage tank 5. The washing water W1 was sent from the storage tank 5 to the four washers 6A, 6B, 6C, and 6D, and the unused washing water W1 was returned to the storage tank 5. Then, data on the amount of washing water W1 used was preliminarily calculated by the control means 9 from the operating information of the washers 6A, 6B, 6C, and 6D, the replenishment water production unit 3 was controlled based on the data on the amount of washing water W1 used, and the production amount of the washing water W1 in the replenishment water production unit 3 was adjusted in accordance with that amount used. In this operation, surplus washing water W1 was discharged as drain water.

As a result, the average flow rate of drain water was 30 mL/min. The variation in the ozone concentration of the washing water W1 sent from the storage tank 5 to the washers 6A, 6B, . . . was <±10%, while the variation in the hydrogen peroxide concentration was also <±10%.

Table 1 also lists the presence or absence of control of the replenishment water production unit, the conductivity-imparting substance and its set value, and the redox potential-adjusting substance and its set concentration in Example 3. Table 2 also lists the variation rate of the conductivity, the variation rate of the concentration of the redox potential-adjusting substance, and the average drain water flow rate.

Example 4

Using the functional aqueous solution supply apparatus 1 illustrated in FIG. 1, the ultrapure water W was supplied to the replenishment water production unit 3, ammonia was added to the ultrapure water W so that the conductivity would be 100 μS/cm, hydrogen gas ($H_2$) (redox potential-adjusting substance) was further added to 1.2 ppm to produce the washing water W1, and the produced washing water W1 was sent to the storage tank 5. The washing water W1 was sent from the storage tank 5 to the four washers 6A, 6B, 6C, and 6D, and the unused washing water W1 was returned to the storage tank 5. Then, data on the amount of washing water W1 used was preliminarily calculated by the control means 9 from the operating information of the washers 6A, 6B, 6C, and 6D, the replenishment water production unit 3 was controlled based on the data on the amount of washing water W1 used, and the production amount of the washing water W1 in the replenishment water production unit 3 was adjusted in accordance with that amount used. In this operation, surplus washing water W1 was discharged as drain water.

As a result, the average flow rate of drain water was 30 mL/min. The variation in the ammonia concentration of the washing water W1 sent from the storage tank 5 to the washers 6A, 6B, . . . was <±10%, while the variation in the hydrogen concentration was also <±10%.

Table 1 also lists the presence or absence of control of the replenishment water production unit, the conductivity-imparting substance and its set value, and the redox potential-adjusting substance and its set concentration in Example 4. Table 2 also lists the variation rate of the conductivity, the variation rate of the concentration of the redox potential-adjusting substance, and the average drain water flow rate.

Example 5

Using the functional aqueous solution supply apparatus 1 illustrated in FIG. 1, the ultrapure water W was supplied to the replenishment water production unit 3, carbon dioxide ($CO_2$) (conductivity-imparting substance) was added to the ultrapure water W so that the conductivity would be 10 μS/cm, hydrogen peroxide was further added to 100 ppm to produce the washing water W1, and the produced washing water W1 was sent to the storage tank 5. The washing water W1 was sent from the storage tank 5 to the four washers 6A, 6B, 6C, and 6D, and the unused washing water W1 was returned to the storage tank 5. Then, data on the amount of washing water W1 used was preliminarily calculated by the control means 9 from the operating information of the washers 6A, 6B, 6C, and 6D, the replenishment water production unit 3 was controlled based on the data on the amount of washing water W1 used, and the production amount of the washing water W1 in the replenishment water production unit 3 was adjusted in accordance with that amount used. In this operation, surplus washing water W1 was discharged as drain water.

As a result, the average flow rate of drain water was 30 mL/min. The variation in the carbonic acid concentration of the washing water W1 sent from the storage tank 5 to the washers 6A, 6B, . . . was <±10%, while the variation in the hydrogen peroxide concentration was also <±10%.

Table 1 also lists the presence or absence of control of the replenishment water production unit, the conductivity-imparting substance and its set value, and the redox potential-adjusting substance and its set concentration in Example 5. Table 2 also lists the variation rate of the conductivity, the variation rate of the concentration of the redox potential-adjusting substance, and the average drain water flow rate.

Example 6

Using the functional aqueous solution supply apparatus 1 illustrated in FIG. 1, the ultrapure water W was supplied to the replenishment water production unit 3, carbon dioxide ($CO_2$) was added to the ultrapure water W so that the conductivity would be 10 μS/cm, ozone ($O_3$) was further added to 30 ppm to produce the washing water W1, and the produced washing water W1 was sent to the storage tank 5. The washing water W1 was sent from the storage tank 5 to the four washers 6A, 6B, 6C, and 6D, and the unused washing water W1 was returned to the storage tank 5. Then, data on the amount of washing water W1 used was preliminarily calculated by the control means 9 from the operating information of the washers 6A, 6B, 6C, and 6D, the replenishment water production unit 3 was controlled based on the data on the amount of washing water W1 used, and the production amount of the washing water W1 in the replenishment water production unit 3 was adjusted in accordance with that amount used. In this operation, surplus washing water W1 was discharged as drain water.

As a result, the average flow rate of drain water was 30 mL/min. The variation in the carbonic acid concentration of the washing water W1 sent from the storage tank 5 to the washers 6A, 6B, . . . was <±10%, while the variation in the ozone concentration was also <±10%.

Table 1 also lists the presence or absence of control of the replenishment water production unit, the conductivity-imparting substance and its set value, and the redox potential-adjusting substance and its set concentration in Example 6. Table 2 also lists the variation rate of the conductivity, the variation rate of the concentration of the redox potential-adjusting substance, and the average drain water flow rate.

Example 7

Using the functional aqueous solution supply apparatus 1 illustrated in FIG. 1, the ultrapure water W was supplied to the replenishment water production unit 3, carbon dioxide ($CO_2$) was added to the ultrapure water W so that the conductivity would be 10 μS/cm, hydrogen gas ($H_2$) was further added to 1.2 ppm to produce the washing water (functional aqueous solution) W1, and the produced washing water W1 was sent to the storage tank 5. The washing water W1 was sent from the storage tank 5 to the four washers 6A, 6B, 6C, and 6D, and the unused washing water W1 was returned to the storage tank 5. Then, data on the amount of washing water W1 used was preliminarily calculated by the control means 9 from the operating information of the washers 6A, 6B, 6C, and 6D, the replenishment water production unit 3 was controlled based on the data on the amount of washing water W1 used, and the production amount of the washing water W1 in the replenishment water production unit 3 was adjusted in accordance with that amount used. In this operation, surplus washing water W1 was discharged as drain water.

As a result, the average flow rate of drain water was 30 mL/min. The variation in the carbonic acid concentration of the washing water W1 sent from the storage tank 5 to the washers 6A, 6B, . . . was <±10%, while the variation in the hydrogen concentration was also <±10%.

Table 1 also lists the presence or absence of control of the replenishment water production unit, the conductivity-imparting substance and its set value, and the redox potential-adjusting substance and its set concentration in Example 7. Table 2 also lists the variation rate of the conductivity, the variation rate of the concentration of the redox potential-adjusting substance, and the average drain water flow rate.

TABLE 2-continued

| Example No. | Variation in conductivity-imparting substance concentration (%) | Variation in redox potential-adjusting substance concentration (%) | Average drain water flow rate (L/min) |
|---|---|---|---|
| Comparative Example 4 | <±10 | <±10 | 110 |
| Comparative Example 5 | <±10 | <±10 | 110 |
| Comparative Example 6 | <±10 | <±10 | 110 |
| Comparative Example 7 | <±10 | <±10 | 110 |
| Comparative Example 8 | ±200 | ±100 | 0 |
| Comparative Example 9 | ±80 | ±100 | 0 |
| Example 1 | <±10 | <±10 | 30 |
| Example 2 | <±10 | <±10 | 30 |

TABLE 1

| Example No. | Presence or absence of control | Conductivity-imparting substance | Conductivity-imparting substance set value (μS/cm) | Redox potential-adjusting substance | Redox potential-adjusting substance concentration (ppm) |
|---|---|---|---|---|---|
| Comparative Example 1 | Absent | Ammonia | 1 | Hydrogen peroxide | 100 |
| Comparative Example 2 | Absent | Ammonia | 100 | Hydrogen peroxide | 100 |
| Comparative Example 3 | Absent | Ammonia | 100 | $O_3$ | 30 |
| Comparative Example 4 | Absent | Ammonia | 100 | $H_2$ | 1.2 |
| Comparative Example 5 | Absent | $CO_2$ | 10 | Hydrogen peroxide | 100 |
| Comparative Example 6 | Absent | $CO_2$ | 10 | $O_3$ | 30 |
| Comparative Example 7 | Absent | $CO_2$ | 10 | $H_2$ | 1.2 |
| Comparative Example 8 | Absent | Ammonia | 1 | Hydrogen peroxide | 100 |
| Comparative Example 9 | Absent | Ammonia | 100 | Hydrogen peroxide | 100 |
| Example 1 | Present | Ammonia | 1 | Hydrogen peroxide | 100 |
| Example 2 | Present | Ammonia | 100 | Hydrogen peroxide | 100 |
| Example 3 | Present | Ammonia | 100 | $O_3$ | 30 |
| Example 4 | Present | Ammonia | 100 | $H_2$ | 1.2 |
| Example 5 | Present | $CO_2$ | 10 | Hydrogen peroxide | 100 |
| Example 6 | Present | $CO_2$ | 10 | $O_3$ | 30 |
| Example 7 | Present | $CO_2$ | 10 | $H_2$ | 1.2 |

TABLE 2

| Example No. | Variation in conductivity-imparting substance concentration (%) | Variation in redox potential-adjusting substance concentration (%) | Average drain water flow rate (L/min) |
|---|---|---|---|
| Comparative Example 1 | <±10 | <±10 | 110 |
| Comparative Example 2 | <±10 | <±10 | 110 |
| Comparative Example 3 | <±10 | <±10 | 110 |

TABLE 2-continued

| Example No. | Variation in conductivity-imparting substance concentration (%) | Variation in redox potential-adjusting substance concentration (%) | Average drain water flow rate (L/min) |
|---|---|---|---|
| Example 3 | <±10 | <±10 | 30 |
| Example 4 | <±10 | <±10 | 30 |
| Example 5 | <±10 | <±10 | 30 |
| Example 6 | <±10 | <±10 | 30 |
| Example 7 | <±10 | <±10 | 30 |

DESCRIPTION OF REFERENCE NUMERALS

1 Functional aqueous solution supply apparatus
2 Pipe conduit
3 Replenishment water production unit
4 Pipe
5 Storage tank
6A, 6B, 6C, 6D Single-wafer type washer (use point)
7 Circulation pipe conduit
7A, 7B, 7C, 7D Supply pipe
8A, 8B, 8C, 8D Return pipe
9 Control means
W Ultrapure water
W1 Washing water (functional aqueous solution)

The invention claimed is:

1. A functional aqueous solution supply apparatus comprising:

a replenishment water production unit configured to produce washing water which comprises water and one or more functional components selected from a conductivity-imparting substance, a redox potential-adjusting substance, and a pH-adjusting substance;

a storage tank configured to store the washing water which is supplied/replenished from the replenishment water production unit;

a circulation-type washing water supply pipe configured to supply the washing water from the storage tank to a use point;

a return pipe configured to return unused washing water at the use point to the circulation-type washing water supply pipe; and a controller configured to: obtain usage plan information of at least one washing water at the use point; predict an amount of the washing water to be used based on the usage plan information to obtain a predicted amount; and control a replenishment amount of the washing water supplied from the replenishment water production unit to the storage tank in accordance with the predicted amount.

2. The functional aqueous solution supply apparatus according to claim 1, wherein the use point has a plurality of washers.

3. The functional aqueous solution supply apparatus according to claim 1, wherein the conductivity-imparting substance comprises at least one selected from the group consisting of ammonia and carbonic acid.

4. The functional aqueous solution supply apparatus according to claim 1, wherein the redox potential-adjusting substance comprises at least one selected from the group consisting of hydrogen peroxide, $O_3$, and $H_2$.

5. The functional aqueous solution supply apparatus according to claim 2, wherein the conductivity-imparting substance comprises at least one selected from the group consisting of ammonia and carbonic acid.

6. The functional aqueous solution supply apparatus according to claim 2, wherein the redox potential-adjusting substance comprises at least one selected from the group consisting of hydrogen peroxide, $O_3$, and $H_2$.

7. The functional aqueous solution supply apparatus according to claim 5, wherein the redox potential-adjusting substance comprises at least one selected from the group consisting of hydrogen peroxide, $O_3$, and $H_2$.

* * * * *